(12) United States Patent
Kim et al.

(10) Patent No.: US 8,112,195 B2
(45) Date of Patent: Feb. 7, 2012

(54) METHOD OF PROVIDING AND UTILIZING INFORMATION FOR VEHICLE TRAVEL

(75) Inventors: Young In Kim, Seoul (KR); Chu Hyun Seo, Seoul (KR); Seung Won Kim, Seoul (KR); Sang O Park, Seoul (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 12/161,374

(22) PCT Filed: Jan. 19, 2007

(86) PCT No.: PCT/KR2007/000315
§ 371 (c)(1),
(2), (4) Date: Oct. 31, 2008

(87) PCT Pub. No.: WO2007/083939
PCT Pub. Date: Jul. 26, 2007

(65) Prior Publication Data
US 2009/0099726 A1    Apr. 16, 2009

Related U.S. Application Data

(60) Provisional application No. 60/759,963, filed on Jan. 19, 2006.

(30) Foreign Application Priority Data

Nov. 23, 2006    (KR) .................. 10-2006-0116370

(51) Int. Cl.
*G01F 7/00*    (2006.01)
(52) U.S. Cl. ........................................ 701/36

(58) Field of Classification Search .................. 280/36; 701/36
See application file for complete search history.

(56) References Cited

U.S. PATENT DOCUMENTS

| | | | |
|---|---|---|---|
| 4,907,159 A | 3/1990 | Mauge et al. | |
| 5,748,107 A | 5/1998 | Kersken et al. | |
| 6,477,459 B1 | 11/2002 | Wunderlich | |
| 2003/0102986 A1 | 6/2003 | Hempel et al. | |
| 2005/0081240 A1 | 4/2005 | Kim et al. | |

FOREIGN PATENT DOCUMENTS

| | | |
|---|---|---|
| EP | 1 041 755 A2 | 10/2000 |
| EP | 1 445 750 | 8/2004 |
| EP | 1 445 750 A2 | 8/2004 |

(Continued)

OTHER PUBLICATIONS

European Search Report dated Sep. 9, 2009 for Application No. 07701022.1, 8 pages.

(Continued)

*Primary Examiner* — Eric Culbreth
(74) *Attorney, Agent, or Firm* — Fish & Richardson P.C.

(57) ABSTRACT

The present invention relates to a method of providing and utilizing information for vehicle travel, such as information about traffic flow on roads, and about parking lots. In an encoding method according to the present invention, at least one component including information for vehicle travel is generated. Information about a time point is included in the generated component. The information about the time point includes a selector, having a bit element indicating whether to use the present date and time and indicating the type of loaded information, and at least one of information elements indicating a year, month, day, hour, minute, and second, depending on the value of the selector.

21 Claims, 14 Drawing Sheets

FOREIGN PATENT DOCUMENTS

| | | |
|---|---|---|
| EP | 1 463 255 | 9/2004 |
| GB | 2 342 260 | 4/2000 |
| JP | 2004-186741 | 7/2004 |
| KR | 2004-0084508 | 10/2004 |
| KR | 2005-0037776 | 4/2005 |
| WO | WO/0213161 | 2/2002 |
| WO | WO 02/082402 | 10/2002 |
| WO | WO 2005/020576 | 3/2005 |

OTHER PUBLICATIONS

International Search Report dated Apr. 25, 2007 for Application No. PCT/KR2007/000315, 7 pages.

European Search Report dated Sep. 16, 2009 for Application No. 07708523.1, 9 pages.

FIG. 2B

```
<ctt_message> : =
<intunli>(mid),                              : message identifier
<intunti>(ver),                              : version number
<intunli>                                    : message length in byte
<bitswitch>(selector),                       : message element
if(selector=xxxxxxx1)<time_t>,               : message creation time
if(selector=xxxxxx1x)<intunlo>,              : unused (Reserved for future use)
if(selector=xxxxx1xx)<intunlo>,              : unused (Reserved for future use)
if(selector=xxxx1xxx)<intunlo>,              : unused (Reserved for future use)
if(selector=xxx1xxxx)<intunlo>,              : unused (Reserved for future use)
if(selector=xx1xxxxx)<intunlo>,              : unused (Reserved for future use)
if(selector=x1xxxxxx)<intunlo>,              : unused (Reserved for future use)
if(selector=1xxxxxxx)<ctt_components>,       : Traffic congestion information
                                                message component
```

FIG. 2C

```
<ctt_components>:=
    <intunti>(n),                    : number of components
    n*<ctt_component()>;             : Traffic congestion information
                                        message component
```

```
<ctt_component (x)>:=: Traffic congestion information message component template
    <intunti>(id),          : identifier (id)
    <intunti>(n),           : length of component data in byte (n)
    n*<bytes>;              : component data
```

FIG. 2E

```
<ctt_component (x)>:=       : CTT-Loc
    <intunti>(id),          : identifier (id)
    <intunli>(n),           : length of component data in byte (n)
    <tpeg_loc_container>;   : TEPG-location container
```

FIG. 3A

```
<ctt_component (80)>:=      : Congestion and Travel Time Status
    <intunti>(id),          : identifier, id=80
    <intunti>(n),           : length of component data in byte (n)
    m*<status_component()>; : status component
```
                                            3c   3b 3a

FIG. 3B

```
<status_component(00)>:=   : Average link speed
<intunti>(id),             : identifier, id=00
<intunti>(n),              : length of component data in byte (n)
<intunti>;                 : speed (km/h)
```

FIG. 3C

```
<status_component(04)>:=   : Link travel time
<intunti>(id),             : identifier id=04
<intunti>(n),              : length of component data in byte (n)
<time_span>;               : time duration
```
                                              3d

FIG. 3D

```
<status_component(05)>:=   : Link delay time
<intunti>(id),             : identifier id=05
<intunti>(n),              : length of component data in byte (n)
<time_span>;               : delay time
```
                                              3e

FIG. 4A

| |  |
|---|---|
| <ctt_component (81)>:= | : Prediction of Congestion and Travel Time Status |
| <intunti>(id), | : identifier, id=81 |
| <intunti>(n), | : length of component data in byte (n) |
| m*<prediction_status_component()>; | : status component |

| | |
|---|---|
| <prediction_status_component(00)>:=:Predicted average link speed | |
| <intunti>(id), | : identifier, id=00 |
| <intunti>(n), | : length of component data in byte (n) |
| <intunti>; | : speed (km/h) |
| <intunlo>; | : prediction time (UTC) |

FIG. 4C

| | |
|---|---|
| <prediction_status_component(01)>:=: predicted travel time for a link | |
| <intunti>(id), | : identifier, id=01 |
| <intunti>(n), | : length of component data in byte (n) |
| <intunti>; | : time (second) |
| <intunlo>; | : prediction time (UTC) |

FIG. 4D

```
<prediction_status_component(03)>:=:Predicted average link speed
<intunti>(id),              : identifier, id=03
<intunti>(n),               : length of component data in byte (n)
<intunti>;                  : speed (km/h)
<specific_&_iterative_time>;  : prediction time
```
~ 5d

FIG. 4E

```
<prediction_status_component(04)>:=: predicted travel time for a link
<intunti>(id),              : identifier, id=04
<intunti>(n),               : length of component data in byte (n)
<time_span>;                : time duration
<specific_&_iterative_time>;  : prediction time
```
~ 5e

FIG. 4F

```
<prediction_status_component(05)>:=:Predicted average link speed
<intunti>(id),              : identifer, id=05
<intunti>(n),               : length of component data in byte (n)
<intunti>;                  : speed (km/h)
<period_of_time>;           : specific prediction period
```
~ 5f

FIG. 4G

```
<prediction_status_component(06)>:=: predicted travel time for a link
<intunti>(id),              : identifier, id=06
<intunti>(n),               : length of component data in byte (n)
<time_span>;                : time duration
<period_of_time>;           : specific prediction period
```
~ 5g

FIG. 5

| | |
|---|---|
| <time_span>:= | : Time Duration |
| <bitswitch>(selector); | |
| if(selector = xxxxxx1) <intunti>, | : Number of years |
| if(selector = xxxxx1x) <intunti>, | : Number of months |
| if(selector = xxxx1xx) <intunti>, | : Number of days |
| if(selector = xxx1xxx) <intunti>, | : Number of hours |
| if(selector = xx1xxxx) <intunti>, | : Number of minutes |
| if(selector = x1xxxxx) <intunti>; | : Number of seconds |

FIG. 6

| | |
|---|---|
| <specific_&_iterative_time>:= | : time based on the present time |
| <bitswitch>(selector); | |
| if(selector = 0xxxxxx1) <intunti>, | : Year, 1..255 : 2000~ 2254 |
| if(selector = 0xxxxx1x) <intunti>, | : Month,  1..12: month |
| if(selector = 0xxxx1xx) <intunti>, | : Day,  1..31: day |
| if(selector = 0xxx1xxx) <intunti>, | : Hour,  1..24: hour+1 |
| if(selector = 0xx1xxxx) <intunti>, | : Minute,  1..60: minute+1 |
| if(selector = 0x1xxxxx) <intunti>, | : Second,  1..60: second+1 |
| If(selector = 01xxxxxx) | : unspecified field:use present date and time |
| If(selector = 10xxxxxx) | : repetition of event |

FIG. 7A

```
<period_of_time>:=                          : A period of an event
  <specific_&_iterative_time>,              : start time
  <specific_&_iterative_time>,              : end time
  <bitswitch>(selector);
  if(selector = xxxxxxx1) <day_selector>,   : an event occurs on the days of a week
  if(selector = xxxxxx1x) <specific_&_iterative_time>;: the specific time on which
                                              an event occurs repeatedly
  if(selector = xxxxx1xx) <time_span>;      : time interval on which an event occurs
```

FIG. 7B

```
<day_selector>:=           : represents one or more days of the week
<bitswitch>(selector);
if(selector = xxxxxxx1)    : Sunday
if(selector = xxxxxx1x)    : Monday
if(selector = xxxxx1xx)    : Tuesday
if(selector = xxxx1xxx)    : Wednesday
if(selector = xxx1xxxx)    : Thursday
if(selector = xx1xxxxx)    : Friday
if(selector = x1xxxxxx)    : Saturday
if(selector = 1xxxxxxx)    : the repetition of an event
```

FIG. 9

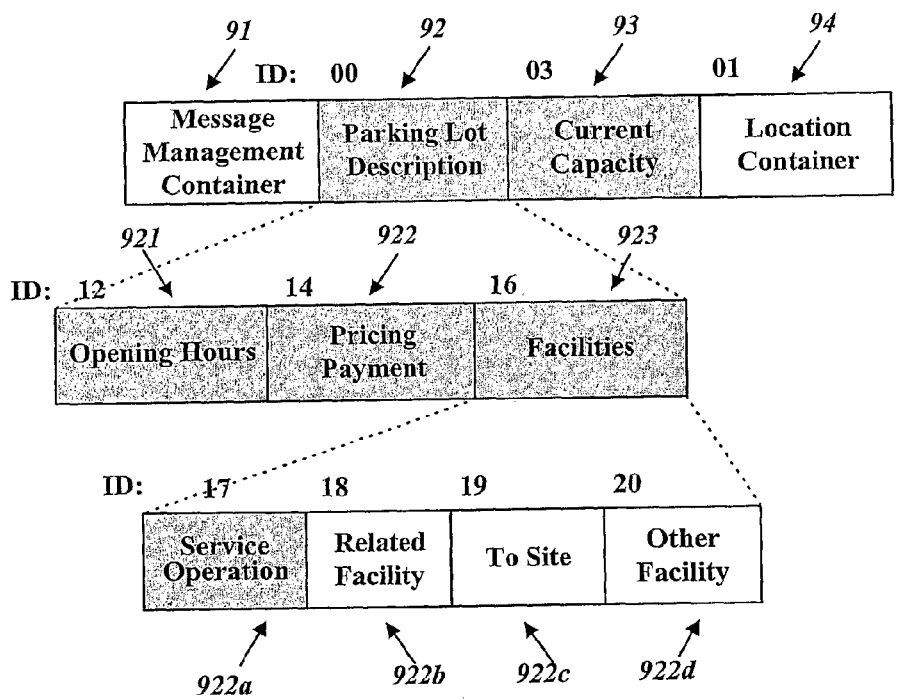

```
ID:       00            03           01
      91↙       92↙         93↙      94↙
   ┌──────────┬──────────┬──────────┬──────────┐
   │ Message  │Parking Lot│ Current  │ Location │
   │Management│Description│ Capacity │Container │
   │Container │          │          │          │
   └──────────┴──────────┴──────────┴──────────┘

ID:   12        14         16
     921↙      922↙       923↙
   ┌──────────┬──────────┬──────────┐
   │ Opening  │ Pricing  │Facilities│
   │  Hours   │ Payment  │          │
   └──────────┴──────────┴──────────┘

ID:   17        18         19         20
   ┌──────────┬──────────┬──────────┬──────────┐
   │ Service  │ Related  │ To Site  │  Other   │
   │Operation │ Facility │          │ Facility │
   └──────────┴──────────┴──────────┴──────────┘
      ↑          ↑          ↑          ↑
     922a       922b       922c       922d
```

FIG. 10A

```
<OpeningHours(12)>:=
<intunti>(id),                  : Identifier = 12
<intunmb>(lengthComp),          : Length, excluding the id and length
<intunmb>(lengthAttr),          : Length of attributes of this component
         (openingHoursType),    :
<intunti>(selector),            :                              1001
if (selector == xxxxxxx1)(pkiTimeType), :
if (selector == xxxxxx1x)<specific_&_iterative_time>,:specific time information
if (selector == xxxxx1xx)<time_span>,    : duration
if (selector == xxxx1xxx)<service_day_type>  :
if (selector == xxx1xxxx) (vehicleType), :       1002
if (selector == xx1xxxxx) <user_type>(userType);
```

FIG. 10B

```
<PricingPayment(14)>:=                                   :
<intunti>(id),                                           : Identifier = 14
<intunmb>(lengthComp),                                   : Length, excluding the id and length
<intunmb>(lengthAttr),                                   : Length of attributes in bytes
<fee_type>(feeType),                                     :
<IntUnLi>(amount),                                       :
<intunti>(selector),                                     :                                   1010
if (selector == xxxxxxx1)<time_type>(pkiTimeType),       :
if (selector == xxxxxx1x)<time_span>,                    :
if (selector == xxxxx1xx)<vehicle_type>(vehicleType),    :
if (selector == xxxx1xxx)<user_type>(userType),          :
<PaymentDetails>;
```

FIG. 10C

```
<ServiceOperation(17)>:=                                 :
<intunti>(id),                                           : Identifier = 17
<intunmb>(lengthComp),                                   : Length, excluding the id and length
<intunmb>(lengthAttr),                                   : Length of attributes in bytes
<intunti>(selector),                                     :
if (selector == xxxxxxx1)(securityType),                 :
if (selector == xxxxxx1x)(parkingGuidanceType),          :
if (selector == xxxxx1xx)(supervisionType),              :
if (selector == xxxx1xxx)(pkiTimeType),                  :
if (selector == xxx1xxxx) <period_of_time>;
```
1020

FIG. 10D

```
<CurrentCapacity(3)>:=                              :
<intunti>(id),                                      : Identifier = 3
<intunmb>(lengthComp),                              : Length, excluding the id and length
<intunmb>(lengthAttr),                              : Length of attributes in bytes
<intunti>(selector),                                :
if (selector == xxxxxxx1)<IntUnLi>(spaces),: The number of all available spaces
if (selector == xxxxxx1x)<IntUnTi>(parkingOccupancy),    : Percent of occupied
                                                           spaces (0-100%)
if (selector == xxxxx1xx)<parking_status>(fillState),: Describes the overall
                                                       status of the lot.
if (selector == xxxx1xxx)<intsili>(fillStateRate), : The rate at which the lot is filling.
if (selector == xxx1xxxx)<time_span>, :Time to take vehicle to actually enter the parking.
if (selector == xx1xxxxx)<availability_type>(availabilityType), : Describes what
                                                                  conditions for parking apply.
<tendency>(tendency),                               :
<CurrentCapacityFor>;
```

1030

METHOD OF PROVIDING AND UTILIZING INFORMATION FOR VEHICLE TRAVEL

1. TECHNICAL FIELD

The present invention relates, in general, to technology for providing information for assisting vehicle travel and utilizing the provided information.

2. BACKGROUND ART

At present, with the development of digital signal processing and communication technology, radio broadcasting and Television (TV) broadcasting signals for providing content using Radio Frequencies (RF) have gradually come to be provided in the form of digital data. As signals are provided in the form of digital data, various types of information can also be provided together with TV or radio broadcasting signals. Such various types of information include news, stock reports, weather, traffic information, etc.

In particular, owing to the increase in the number of vehicles in downtown areas and the number of vehicles leaving for vacations on holidays, the necessity to provide traffic information for vehicle drivers has steadily increased. Consequently, a method of providing traffic information about roads as additional information through satellite broadcasting or airwave broadcasting has been developed.

However, the provision of such traffic information requires unified standards because a plurality of terminals produced by different manufacturers must be used to detect broadcasted digital traffic information, must interpret the detected information in the same way, and must provide the interpreted information to users.

3. DISCLOSURE OF INVENTION

Accordingly, the present invention has been made keeping in mind the above problems occurring in the prior art, and an object of the present invention is to provide a method of configuring time information in order to efficiently provide information that is useful for vehicle travel.

Another object of the present invention is to provide a method of utilizing information for vehicle travel, having time information configured using the above configuration method.

In accordance with an aspect of the present invention to accomplish the above objects, there is provided a method of encoding information for vehicle travel, comprising generating at least one component including information for vehicle travel, and incorporating information about a time duration into the component, the information about the time duration including a selector indicating a type of loaded information, and including at least one of information elements indicating number of years, number of months, number of days, number of hours, number of minutes, and number of seconds, depending on a value of the selector.

In accordance with another aspect of the present invention to accomplish the above objects, there is provided a method of encoding information about vehicle travel, comprising generating at least one component including information for vehicle travel, and incorporating information about a time point into the component, the information about the time point including a selector indicating a type of loaded information, and including at least one of information elements indicating a year value, a month value, a day value, an hour value, a minute value, and a second value, depending on a value of the selector.

In accordance with a further aspect of the present invention to accomplish the above objects, there is provided a method of encoding information for vehicle travel, comprising generating at least one component including information for vehicle travel, and incorporating information about a period into the component, the information about the period including period information for designating a specific period, and a selector for indicating a type of loaded information, and including at least one of a day selection information element, a time point information element, and a duration information element, depending on a value of the selector.

In one embodiment according to the present invention, the selector included in the information about the time point may include a bit element indicating whether repetition occurs at a time point designated by part or all of the information elements, which follows the selector.

In one embodiment according to the present invention, respective time elements, indicating start time and end time in the period information, may have time values coded according to a same type as that of the time point information element.

In one embodiment according to the present invention, the day selection information element may include a selector for individually indicating Monday, Tuesday, Wednesday, Thursday, Friday, Saturday, or Sunday, as a bit value, and indicating whether at least one day indicated in this way is repeated, as a bit value.

In one embodiment according to the present invention, the information for vehicle travel may be information about traffic flow status for a road link.

In another embodiment according to the present invention, the information for vehicle travel may be information about parking lots for vehicles.

4. BRIEF DESCRIPTION OF DRAWINGS

FIG. 2B is a diagram showing the syntax of a TPEG-CTT message;

FIG. 2C is a diagram showing the syntax of the configuration format of components for transmitting traffic flow information;

FIGS. 2D and 2E are diagrams showing the syntaxes of CTT components for transmitting a CTT event and location information, respectively;

FIG. 3A is a diagram showing the structure of traffic flow information included in a CTT event container;

FIGS. 3B to 3D are diagrams showing the syntaxes of average link speed information, link travel time information, and link delay information, loaded in the status component of FIG. 3A;

FIG. 4A is a diagram showing the structure of predicted information for traffic flow information included in the CTT event container;

FIGS. 4B to 4G are diagrams illustrating the syntaxes of predicted average speed and predicted link travel time, respectively, loaded in the status component of FIG. 4A according to embodiments of the present invention;

FIG. 5 is a diagram showing the syntax of the type of information that is used to designate an arbitrary duration according to an embodiment of the present invention;

FIG. 6 is a diagram showing the syntax of the type of information that is used to designate an arbitrary time point according to an embodiment of the present invention;

FIGS. 7A and 7B are diagrams showing the syntaxes of the types of information that is used to designate an arbitrary specific period and a specific time point and/or time duration within the period according to an embodiment of the present invention;

FIG. 9 is a diagram illustrating part of a format for providing information about a parking lot according to an embodiment of the present invention;

FIGS. 10A to 10D are diagrams illustrating syntaxes of part of components of FIG. 9 according to an embodiment of the present invention;

5. MODES FOR CARRYING OUT THE INVENTION

Hereinafter, embodiments of the present invention will be described in detail with reference to the attached drawings.

Figure 1:
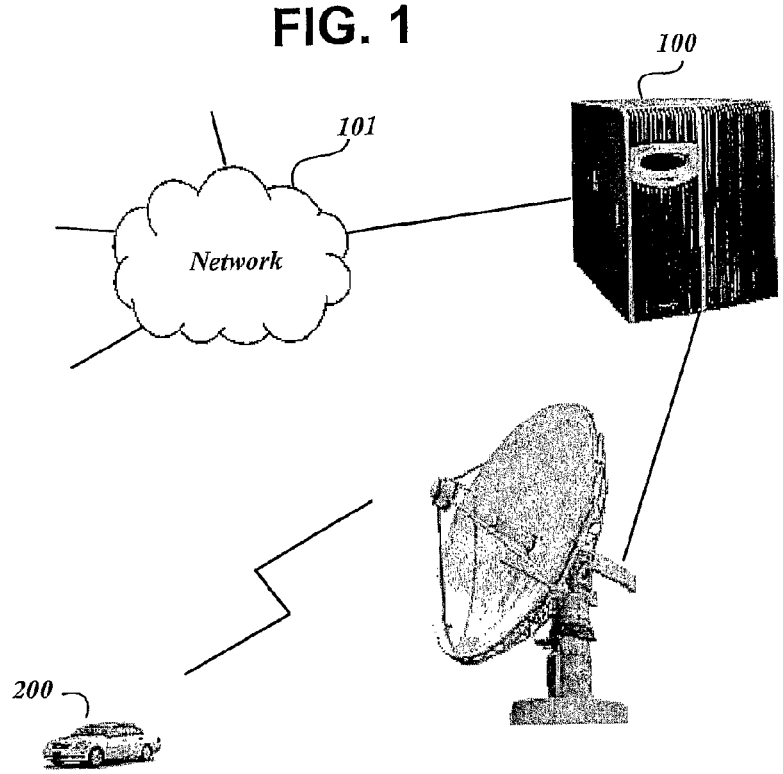
FIG. 1 is a diagram showing a network system for providing information required for vehicle travel according to the present invention.

First, a method of providing information required for vehicle travel as a Radio Frequency (RF) signal according to the present invention is described. FIG. 1 is a diagram briefly showing a network system for providing information required for vehicle travel according to the present invention. In the network system of FIG. 1, a traffic information provision server 100 provided in broadcasting headquarters reconstructs various types of information input through various paths, for example, various types of traffic information input by an operator, or collected from other servers or probe cars, over a network 101, along with information about parking lots collected by other servers, and transmits the reconstructed information as RF signals so that a traffic information reception terminal, for example, a navigation device, mounted in a vehicle 200, can receive the reconstructed information.

Figure 2A:
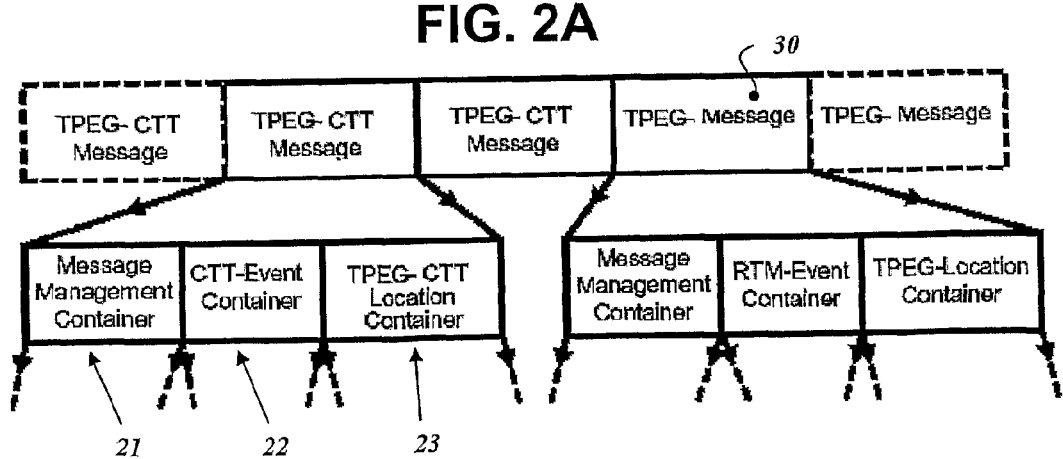
FIG. 2A is a diagram showing the format for providing traffic flow information transmitted in a wireless manner.

The traffic information provision server 100 transmits various types of traffic information required for vehicle travel, for example, information about road congestion (also called 'traffic flow information'), road obstruction information, information about parking lots, etc., in a wireless manner. The information about road congestion is provided through the message structure as shown in FIG. 2A. This structure is now described in detail. As shown in the drawing, the format of congestion information is composed of a sequence of message segments (hereinafter referred to as 'Transport Protocol Export Group [TPEG]-Congestion and Travel-Time [CTT]' information messages). In the sequence, one message segment, that is, the TPEG-CTT message, is composed of a message management container 21, a CTT event container (application event container) 22, and a TPEG-CTT location container (TPEG location container) 23, and the syntax thereof is shown in FIG. 2B. Traffic information other than CTT events, for example, information 30 related to the occurrence of obstructions to the travel of vehicles on a road (an accident, slippery road conditions, etc.) is also transmitted through the message structure of FIG. 2A.

The message management container 21 is used to manage date and time information. This time information does not include a start time, an end time, a message erase time or schedule information. Instead, information such as a message generation time is generated and included. The message generation time is included in all of the messages on the basis of the message transmission time point. In the CCT event container 22 for transmitting congestion information, current traffic status information (congestion and travel time status) for each link (road section), predicted traffic information (prediction of congestion and travel time status), etc., are generated and included. The current traffic status information (congestion and travel time status) includes an average link speed, a link travel time, a link delay, etc.

Further, in the TPEG-CTT location container 23, information enabling the location of a link to be detected is included. In this case, the term "link" means a road section that is disposed between intersections and has no other intersection for vehicles along its length.

As shown in FIG. 2C, each of the CTT event container and the TPEG-location container is composed of one or more CTT components 201. Each CTT component is configured according to the syntax of FIG. 2D when congestion information is loaded, and is configured according to the syntax of FIG. 2E when location information is loaded.

As described above, the CTT event container 22 is composed of one or more generated CTT components. When the identifier of each CCT component is 80h (where 'h' is a hexahedral number), the CTT component includes status components including congestion information (current status information) related to average link speed, link travel time, and link delay, which are current traffic flow information. Further, when the identifier of each CCT component is 81h, the CCT component includes status components for individually transmitting predicted congestion information (prediction CTT Status), which includes predicted average link speed, predicted link travel time, etc.

FIG. 3A is a diagram showing the configuration of a traffic congestion information component for transmitting current traffic flow information included in the CTT event container. The traffic congestion information component is assigned an identifier '80h' (3a), includes m status components (3c), and has a field (3b) in which the length of the overall data of the included status components is represented in bytes.

In each status component, information about the above-described average link speed, link travel time, and link delay is loaded in the format of FIGS. 3B to 3D. The average link speed is assigned the identifier '00', the link travel time is assigned the identifier '04', and the link delay is assigned the identifier '05'. In this case, the link delay denotes the amount that link travel time based on the current traffic flow situation is increased over the time required to pass through the same link at a standard speed.

The time information 3d and 3e included in the link travel time and the link delay are values coded according to the <time_span> information type of FIG. 5, defined according to an embodiment of the present invention. The syntax of the information type of FIG. 5 is described in detail. The value of a selector corresponding to a bitswitch comes first, and one additional byte follows each bit having a value of 1 in the selector. When one or more bytes follow, the bytes are arranged in the sequence of proximity of corresponding bits to the Least Significant Bit (LSB) of the selector. For example, if values of the <time_span> information type are "18h 02h 1Eh", the value corresponding to the selector is 18h, which indicates that bits corresponding to minute and second have been set. Accordingly, 02h is a value corresponding to 00001000, in which a value of 1 is closer to the LSB, that is, hour, and 1Eh (=30) is a value corresponding to 00010000, that is, minute. Therefore, <time_span>:="18h 02h 1Eh" represents a time duration corresponding to 2 hours and 30 minutes. As another example, "06h 01h 0Fh" means a period corresponding to 1 month and 15 days.

Therefore, if it takes 30 minutes to pass through a given link, the traffic information provision server 100 fills the status component for travel time of FIG. 3C for that link with a value of "04h 02h 10h 1Eh". In this case, the first 04h is an ID indicating that the status component is related to link travel time, 02h is a value indicating the length of additional data (that is, data corresponding to <time_span>: 3d), and "10h 1Eh" is a value coded according to the <time_span> information type shown in FIG. 5, which is interpreted using the above-described method, and indicates 30 minutes.

In the same manner, when the delay for a travel time for a given link is 45 minutes, the status component for the link delay of FIG. 3d for that link is loaded with a value of "05h 02h 10h 2Dh". In this case, the latter part "10h 2Dh" is a value corresponding to the <time_span> information type shown in FIG. 5, which is interpreted using the above-described method, and indicates 45 minutes.

In another embodiment of the present invention, each of the status components for link travel time and link delay may have one byte of time information (<intunti>) instead of the <time_span> information type of FIG. 5. The status components for link travel time and link delay, each having one byte of time information instead of the <time_span> information type in this way, are assigned different identifier values, for example, 01 and 02, respectively, so that they can be distinguished from the status components of FIGS. 3C and 3D. In this way, the status components are distinguished from each other using identifiers, so that a terminal for receiving traffic information can recognize which type of coded duration information has been loaded in the status components, and can decode the coded duration information according to the recognition results.

As described above, the traffic information provision server 100 also provides predicted status information as well as current status information. FIG. 4A illustrates the structure of a component for transmitting predicted congestion information included in the CTT event container. The congestion information component for transmitting predicted information is assigned an identifier '81h' (5a), includes m status components (5c), and has a field (5b) in which the total length of the data of the included status components is represented in bytes.

In each status component, the above-described predicted average link speed and predicted link travel time (other types of predicted information about traffic flow status may additionally exist) are loaded in the format of FIGS. 4B and 4C. An identifier '00' is assigned to the predicted average link speed, and an identifier '01' is assigned to the predicted link travel time. As shown in FIGS. 4B and 4C, in the status components loaded with predicted information, a future prediction time is loaded in a four-byte (<intunlo>) field coded in a Universal Time Coordinated (UTC) format, and is then transmitted. In this case, the prediction time represents the time for which it is desired to obtain predicted information, that is, a specific future day or time, rather than the present time.

In order to obtain predicted information, the server 100 generates predicted information for an average link speed, link travel time, etc., on the basis of current traffic information, collected through a plurality of paths, and a traffic information Database (DB), stored in the server. Hereinafter, an example of the obtainment of the predicted information is described in detail.

Figure 8A:
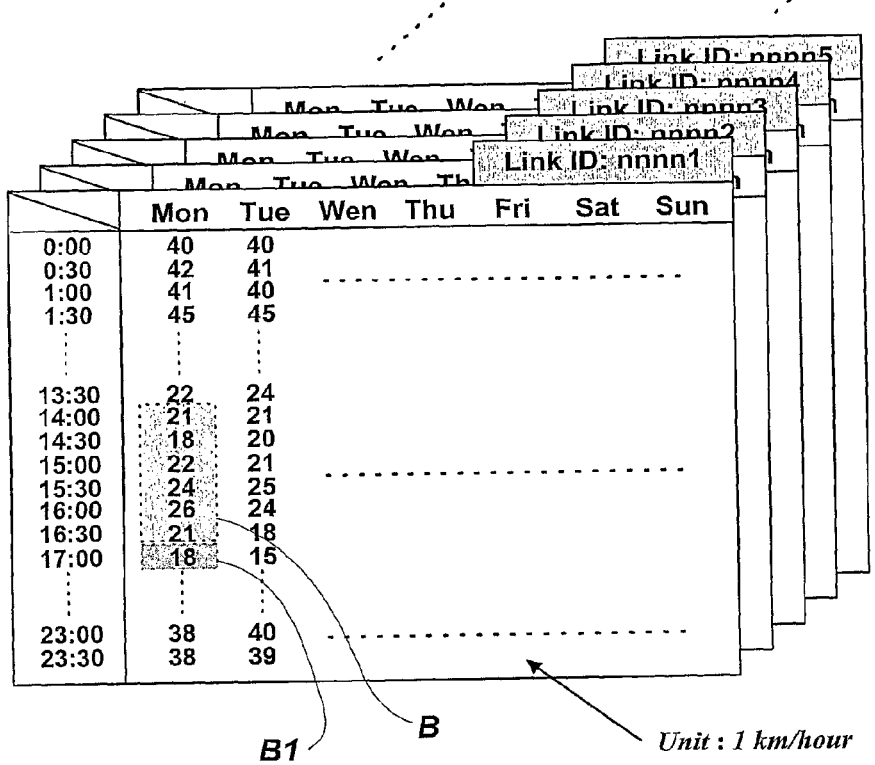
FIG. 8A is a diagram showing an example of a database storing therein a history of traffic flow information for each link to provide predicted traffic flow information.
Figure 8B:
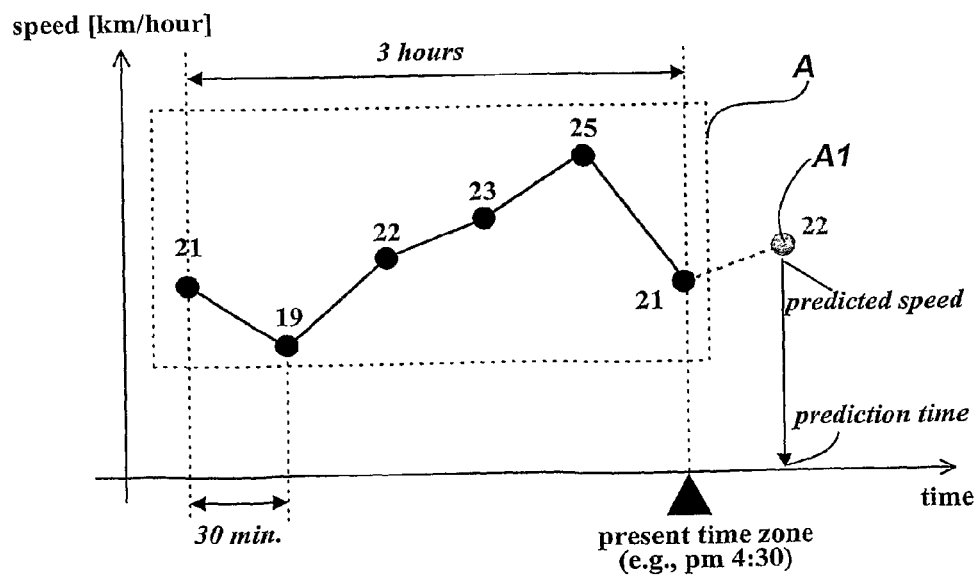
FIG. 8B is a diagram showing an example of a method of predicting an average speed for a specific link using the database of FIG. 8A.

First, in order to provide predicted traffic flow information, the server 100 stores the average link speed of the traffic flow information, provided by the server 100 for each link, according to day, time zone, week, and month/year. Further, traffic flow information, obtained, for example, at regular intervals of 30 minutes, is arranged in a database, and is stored in the form shown in FIG. 8A. Numerical values shown in FIG. 8A are based on units of km/h, and comply with a speed indication method for transmitting the numerical values as traffic flow information. Further, the pattern of variation in speed is compared to the pattern stored in the DB corresponding to the present day and time zone, while currently provided average speeds for each link are obtained every thirty minutes, and are continuously updated and stored for a predetermined period, for example, for three hours. For example, when FIG. 8B illustrates the pattern of speed variation A stored for three hours up to the present time, that is, 4:30 PM in Monday, the pattern is compared to the pattern of speed variation B obtained during the period ranging from 1:30 PM to 4:30 PM in Monday and stored in the DB of FIG. 8A. If the difference between the patterns of speed variation, for example, the sum of absolute values of the speed differences corresponding to respective time zones (the sum of speed difference can be obtained by assigning a larger weight to the speed difference corresponding to a time zone that is close to the present time zone, compared to the speed difference corresponding to a time zone that is distant from the present time zone) is equal to or less than a preset reference value, that is, when the speed variation pattern is determined to be usable as a result of the comparison to the pattern of the DB of FIG. 8A, the server 100 reads an average speed B1 corresponding to a time zone starting 30 minutes after the present time, that is, a time zone starting at 5:00 PM, from the DB, determines the read average speed to be a predicted average speed for a corresponding road link, configures the predicted average speed in the format of FIG. 4B, 4D or 4F (the formats of FIGS. 4D and 4F will be described later), and transmits the configuration results. Of course, traffic flow status may also be predicted for time zones starting 1 hour, 1 hour and 30 minutes, 2 hours, or more after the present time, in addition to the time zone starting 30 minutes after the present time, so that predicted average link speed can be provided together with prediction time information.

If the difference between the speed variation patterns is greater than a preset reference value, that is, if the obtained speed variation pattern is not identical to the pattern of the DB of FIG. 8A as a result of the comparison, no predicted average link speed is provided. Alternatively, a change in pattern is detected in the above-described speed variation pattern, which is obtained and stored for a predetermined period, that is, three hours, as shown in FIG. 8B, so that a value A1, obtained by predicting an average speed for a time zone starting 30 minutes after the present time, may be provided as a predicted average link speed. In order to obtain a predicted value from FIG. 8B, a method of assigning the highest weight to the present time, and gradually decreasing weights to corresponding times sequentially more distant from the present time, multiplying the assigned weights by respective average link speeds, and obtaining a predicted average link speed using the average value of the multiplied results, can be used, or one of various well-known graph estimation methods can be used.

Meanwhile, through the above method, if the predicted average link speed for a time zone subsequent to the present time, for example, a time zone starting 30 minutes after the present time, is obtained with respect to each link, the server 100 also obtains predicted link travel time for each link, configures the predicted link travel time in the format of FIG. 4C, 4E or 4F (the formats of FIGS. 4E and 4F will be described later), together with prediction time information, and transmits the configuration results. In the case of the predicted link travel time, the length of each link in the information about each section, that is, each link, arranged in the DB thereof can be obtained using the predicted average speed.

In another embodiment of the present invention, prediction time for which predicted information is desired to be transmitted can be configured according to the <specific_&_iterative_time> information type of FIG. 6. The status components for the predicted average link speed and the predicted link travel time, having information about prediction time (5d and 5e) configured according to the <specific_&_iterative_time> information type, have identifiers differing from those of corresponding components of FIGS. 4B and 4C, for example, identifiers of 03 and 04, respectively, as shown in FIGS. 4D and 4E. Further, in the present embodiment, the status component for predicted link travel time has information (5f) coded according to the <time_span> information type of FIG. 5, for each predicted travel time, as shown in FIG. 4E.

The syntax of the information type of FIG. 6 is described in detail. The value of a selector corresponding to a bitswitch comes first, and one additional byte follows each bit having a value of 1 in the selector. When one or more bytes follow, the bytes are arranged in the sequence of proximity of corresponding bits to the LSB of the selector. For example, when a value corresponding to the <specific_&_iterative_time> information type is "58h 0Eh 1Fh", a value corresponding to the selector is 58h (=0101 1000), which indicates that bits corresponding to the field descriptions of 'unspecified field: use the present date and time', minute, and hour are set. Accordingly, 0Eh (=14) is a value corresponding to 00001000, in which a value of 1 is closer to LSB, that is, the hour, and 1Fh (=31) is a value corresponding to 00010000, that is, the minute. Further, since no elements for the remaining fields (year, month, day, and second exist, time components corresponding to the present date and time are used. Therefore, <specific_&_iterative_time>:="58h 0Eh 1Fh" denotes the time point corresponding to 13:30 on Oct. 12, 2006, assuming that the present date is Oct. 12, 2006 (here, the seconds are not important, and thus are ignored. This also applies to subsequent description). In the year, hour, minute and second fields of <specific_&_iterative_time>, values greater than actual values by 1 are recorded, as shown in FIG. 6. Accordingly, 0Eh (=14) denotes 13:00, and 1Fh (=31) denotes 30 minutes. As a further embodiment, "50h 1Fh" indicates that bits corresponding to the field descriptions of 'unspecified field: use the present date and time' and minute are set, so that 1Fh is a value for minutes, and, consequently, "50h 1Fh" is time point information indicating 15:30 on Oct. 12, 2006, assuming that the present date and time are 15:00 on Oct. 12, 2006.

The <specific_&_iterative_time> information type shown in FIG. 6 uses information about the present date and time, thus reducing the amount of information required to transmit information about an arbitrary time point, compared to the embodiments of FIGS. 4B and 4C. Of course, information about the given date and time can be transmitted using all of the fields. For example, if a time point corresponding to 15:30:00 on Oct. 12, 2006, is coded according to the <specific_&_iterative_time> information type, "3Fh 07h 0Ah 0Ch 0Eh 1Fh 01h" is obtained. Here, 3Fh is the value for the selector, and the bytes sequentially represent values corresponding to the year, month, day, hour, minute, and second.

Therefore, when the travel time predicted for 14:30 today for a given link is 30 minutes, the traffic information provision server 100 fills the status component for predicted travel time for the link, as shown in FIG. 4E, with the value "04h 05h 10h 1Eh 58h 0Fh 1Fh". In this case, the first 04h is an ID indicating that the status component includes a predicted link travel time of the <specific_&_iterative_time> information type, 05h is a value indicating the length of additional data (that is, data 5e and 5f, corresponding to <time_span> and <specific_&_iterative_time> information types), and "10h 1Eh" is a value which is based on the <time_span> information type shown in FIG. 5, is interpreted using the above method, and thus indicates 30 minutes. A value of "58h 0Fh 1Fh" is a value which is coded according to the <specific_&_iterative_time> information type of FIG. 6, is interpreted using the above method, and thus indicates that the prediction time point is 14:30 on Oct. 12, 2006, given that the present date is Oct. 12, 2006.

Through the same method, when the average speed predicted for 14:30 today for a given link is 40 km/h, the status component for the predicted average speed for the link, as shown in FIG. 4D, is loaded with the value "03h 04h 28h 58h 0Fh 1Fh". In this case, 28h is a value indicating a speed of 40 km/h, and "58h 0Fh 1Fh" is a value which is based on the <specific_&_iterative_time> information type of FIG. 6, is interpreted using the above-described method, and thus indicates that the prediction time point is 14:30 on Oct. 12, 2006, given that the present date is Oct. 12, 2006.

In yet another embodiment of the present invention, the server 100 transmits predicted information for a specific period, rather than at a specific time point, when transmitting predicted traffic flow information for a link. FIGS. 4F and 4G illustrate the structures of status components for predicted average link speed and predicted link travel time, respectively, for a specific period. The status components, including predicted traffic flow information about an average speed and a travel time for a specific period, as shown in FIGS. 4F and 4G, are assigned identifiers of 05 and 06, respectively. However, when predicted traffic flow information at a specific time point, that is, the status information of FIGS. 4D and 4E, is not provided together, other identifiers, for example, 03 and 04, respectively, can be assigned.

In this embodiment, specific period information 5f and 5g, loaded in the status components of FIGS. 4F and 4G, including information predicted for a specific period, is configured according to the <period_of_time> information type of FIG. 7A.

The syntax of the information type of FIG. 7A is described in detail. The syntax includes a period information field 7a, indicating the start time and end time of the specific period for which information is configured according to the <specific_&_iterative_time> information type of FIG. 6, and a <selector> field corresponding to a bitswitch, and selectively includes a <day_selector> field following the selector, a <specific_&_iterative_time> field, the syntax of which is shown in FIG. 6, or a <time_span> field, the syntax of which is shown in FIG. 5, depending on the value of the selector. In the <day_selector> field, a one-byte value coded according to the type, the syntax of which is shown in FIG. 7B, is written. As shown in the drawing, the lower 7 bits of the one-byte value designate each day of the week, and the MSB thereof indicates the repetition of a corresponding day. For example, when <day_selector>=01h, it means that the day of the week (on which an event indicated by other information occurs) is Sunday. When <day_selector>=84h, the event in question is repeated every Tuesday.

Further, the <specific_&_iterative_time> field 7b, selectively following depending on the selector in the <period_of_time> information type of FIG. 7A, is loaded with information about the time at which an event is repeated every day for a specific period designated in the period information field 7a. The selectively following <time_span> field 7c is loaded with information about the duration starting from the time designated in the <specific_&_iterative_time> field 7b. Of course, when only a time point within a specific period is designated, the <time_span> field is not included.

Therefore, when construction is scheduled for a period ranging from Oct. 1, 2006 to Jan. 1, 2007 for a given link, and is to be conducted from Monday to Thursday for that period, the traffic information provision server 100 provides a predicted travel time for the link during the construction period, using the status component of FIG. 4G. In this case, the start time field for the specific period in the <period_of_time> field of FIG. 7A (5g of FIG. 4G), included in the status component, is loaded with Oct. 1, 2006, the end time field is loaded with Jan. 1, 2007, the selector field is loaded with a value of 01h, indicating that the <day_selector> field follows, and the <day_selector> field is loaded with a value of 9Eh (=1001 1110), indicating days ranging from Monday to Thursday, and the repetition of the construction.

Through the same method, when construction is scheduled for a period ranging from Oct. 1, 2006 to Jan. 1, 2007 for a given link, and is to be conducted for a duration ranging from 10 PM to 12 AM from Monday to Friday within that period, the traffic information provision server 100 provides a predicted average speed for the link using the status component of FIG. 4F. In this case, the start time field for the specific period in the <period_of_time> field of FIG. 7A (5f of FIG. 4F) included in the status component is loaded with Oct. 1, 2006, the end time field is loaded with Jan. 1, 2007, and the selector field is loaded with a value of 07h indicating that the <day_selector>, 20<specific_&_iterative_time>, and <time_span> fields sequentially follow. Further, the <day_selector> field is loaded with a value of BEh (=1011 1110) indicating days, ranging from Monday to Friday, and the repetition of an event, the <specific_&_iterative_time> field is loaded with a value of "58h 17h 01h" indicating 10 PM, and the <time_span> field is loaded with a value of "08h 02h", indicating two hours.

Meanwhile, as described above, the traffic information provision server 100 also provides information about parking lots, which is information for vehicle travel to the terminal. FIG. 9 illustrates part of a message transmission format for providing information about a parking lot. The server 100 provides more and various components, for example, components for the name of a parking lot, parking limitation information, etc., in addition to the components shown in the format of FIG. 9, but the information about such components is not directly related to the present invention, and thus a description thereof is omitted. Furthermore, descriptions of components, included in the drawing, and attribute fields, included in each component, are also omitted if they are not directly related to the present invention. However, an information provision method, which will be described later, can obviously be applied to other pieces of information about a parking lot which are not described in the present specification, thus the scope of the present invention is not limited to the components presented in the description of the present invention.

The provision format of FIG. 9 is described. A single message segment includes a message management container 91, a parking lot description component 92, a current capacity component 93, and a location container 94. Further, the parking lot description component 92 includes an open hours component 921 configured according to the syntax of FIG. 10A, a pricing/payment component 922 configured according to the syntax of FIG. 10B, and a facility component 923. The facility component 923 includes a service operation component 922a configured according to the syntax of FIG. 10C, a related facility component 922b, a target site component 922c, and an other-facilities component 922d.

The open hours component 921, configured and provided as shown in FIG. 10A, is adapted to indicate the open hours of parking lots (information about locations, names, etc. is provided by other components, and thus parking lots are individually identified), and is adapted to include an open hours type (openingHoursType), and to selectively include a parking lot time type (pkiTimeType), a parking service day type (service_day_type), a vehicle type (vehicleType), or a user type (userType), depending on the value of a selector. In particular, the open hours component 921 includes a <time_span> field 1002, and a <specific_&_iterative_time> field 1001, the syntaxes of which are shown in FIGS. 5 and 6, respectively, depending on the value of the selector.

The <specific_&_iterative_time> field 1001 is loaded with information about the opening time point of a parking lot which is coded according to the syntax of FIG. 6. For example, if the parking lot is open at 7 AM every day, the field 1001 is loaded with a value of "C8h 08h". The Most Significant Bit (MSB) '1' of C8h (=1100 1000) indicates repetition. Further, the <time_span> field 1002 is loaded with information about the duration for which the parking lot is open, and which is configured according to the syntax of FIG. 5. For example, if the parking lot is open for 15 hours from the opening time point, the field 1002 is loaded with a value of "08h 0Eh".

The pricing/payment component 922, configured and provided as shown in FIG. 10B, is adapted to indicate the price system of each parking lot, and is adapted to include a parking fee type (feeType), and the type of parking fee per unit time (amount), and to selectively include a parking lot time type (pkiTimeType), a vehicle type (vehicleType), a user type (userType), or a payment detail type (PaymentDetails), depending on the value of a selector. In particular, the pricing/payment component 922 includes a <time_span> field 1010, the syntax of which is shown in FIG. 5, to indicate a unit time for parking fee, depending on the value of a selector. The <time_span> field 1010 is loaded with information about the unit time for the parking fee, which is coded according to the syntax of FIG. 5. For example, in the case of a parking lot for which a parking fee designated in a field for the parking fee (amount) is paid for increments of 10 minutes, the corresponding field 1010 is loaded with a value of "10h 0Ah".

The service operation component 922a, configured and provided as shown in FIG. 10C, can be adapted to indicate services provided in a parking lot, for example, a security or supervision service, and is adapted to selectively include a security type (securityType), a parking guidance type (parkingGuidanceType), a supervision type (supervisionType), and a parking lot time type (pkiTimeType), depending on the value of a selector. In particular, the service operation component 922a includes a <period_of_time> field 1020, the syntax of which is shown in FIG. 7A, to indicate the period for which service is provided in the parking lot, depending on the value of a selector. For example, when a security service is provided only on weekdays, but not on Saturdays and Sundays, for a period ranging from Oct. 1, 2006 to Dec. 31, 2006, the start time field of the period information field 7a in the <period_of_time> attribute of FIG. 7A is loaded with Oct. 1, 2006, the end time field thereof is loaded with Dec. 31, 2006, the selector field is loaded with a value of 01h, indicating that the <day_selector> field follows, and the <day_selector> field is loaded with a value of BEh (=1011 1110), indicating days ranging from Monday to Friday, and repetition. Of course, when the security service is operated for a period during which the parking of vehicles is permitted, for example, a period ranging from 7:00 AM to 6:00 PM, the <specific_&_iterative_time> field of the <period_of_time> field is loaded with a value obtained by coding 7:00 AM, and the <time_span> field thereof is loaded with a value obtained by coding 11 hours, so that all of the information elements in the <period_of_time> field are used.

The server 100 configures and provides the current capacity component 93 for a parking lot, as shown in FIG. 10D. As shown in the drawing, the current capacity component 93 selectively includes an available parking space field (spaces), a parking occupancy rate field (parkingOccupancy), a parking status field (fillState), a parking status variation rate (fillStateRate), and an available parking type (availableType), depending on the value of the selector. In particular, the current capacity component 93 includes a <time_span> field 1030, the syntax of which is shown in FIG. 5, to indicate the time required to complete the parking operation of a vehicle, depending on the value of the selector. For example, when it takes 5 minutes to complete a parking operation after a vehicle enters a parking lot, the corresponding field 1030 is loaded with a value of "10h 05h".

Figure 11:
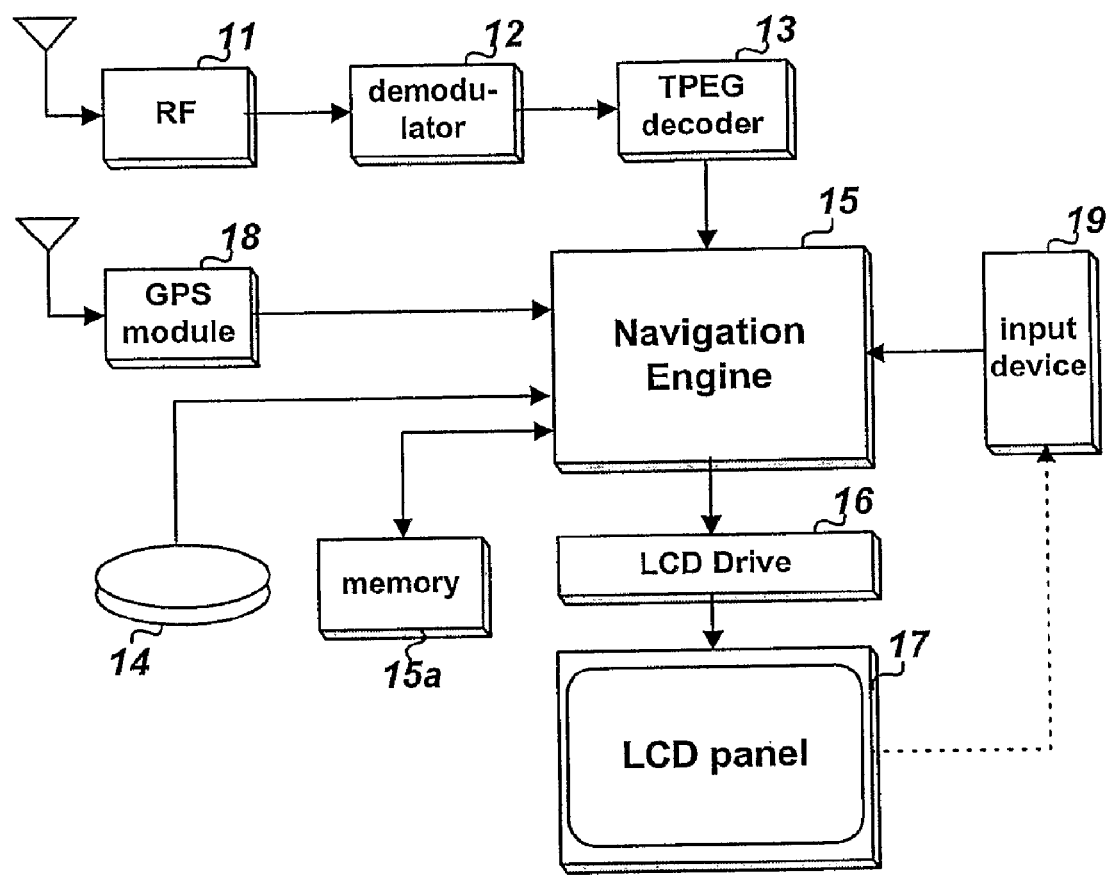
FIG. 11 is a diagram showing the construction of a navigation terminal adapted to receive information for vehicle travel from a server, and mounted in a vehicle or the like, according to an embodiment of the present invention.

FIG. 11 illustrates the construction of a navigation terminal which receives information for vehicle travel, configured and transmitted by the server 100 through the above method, and which is mounted in a vehicle, etc., according to an embodiment of the present invention. The terminal of FIG. 11 includes a tuner 11 for tuning a signal band, in which information for vehicle travel is provided, and outputting a modulated vehicle travel information signal, a demodulator 12 for demodulating the modulated vehicle travel information signal and outputting an information signal for vehicle travel, a TPEG decoder 13 for decoding the demodulated information signal for vehicle travel, and obtaining traffic flow status information, parking lot information, etc., required for vehicle travel, a Global Positioning System (GPS) module 18 for receiving satellite signals transmitted from a plurality of low orbital satellites, and detecting a current location (longitude, latitude, and altitude), a storage means 14 for storing therein an electronic map, having information about respective links and nodes, and various types of graphic information, an input device 19 for receiving an input from a user, a navigation engine 15 for controlling screen display on the basis of the user's input, current location, and information for vehicle travel that is obtained through decoding, memory 15a for temporarily storing necessary information, a Liquid Crystal Display (LCD) panel 17 for displaying images, and an LCD drive 16 for applying driving signals, corresponding to graphic images to be displayed, to the LCD panel 17. The unit device 19 may be implemented using a touch screen provided on the LCD panel 17.

The tuner 11 tunes a signal transmitted from the server 100, and the demodulator 12 demodulates and outputs the tuned signal using a designated method. Then, the TPEG decoder 13 decodes the input demodulated signal into a TPEG message sequence configured as shown in FIG. 2A and/or FIG. 9, interprets each TPEG message in the sequence, and transmits required information and/or control signals, corresponding to the content of the message, to the navigation engine 15.

The TPEG decoder 13 extracts date/time and message generation time, included in the message management container of each TPEG message, from the TPEG message, and determines whether the following data is related to a CTT event container or a parking lot information component on the basis of the information of 'message elements'. If it is determined that the following data is related to a CTT event container, the information obtained from the CTT component of the container is transmitted so that a display operation based on current and predicted traffic flow information, which will be described later, is performed by the navigation engine 15. Further, the TPEG decoder 13 obtains location information corresponding to currently transmitted traffic flow information from the subsequent TPEG-CTT location container. Such location information may be managed as start time and end time location coordinates composed of coordinate values depending on the type information of the TPEG-CTT location container (longitude and latitude), or as unique values for respective links. Such unique values are link IDs separately assigned to respective links. When the storage means 14 is provided, a link corresponding to received information is specified with reference to information about respective links and nodes, stored in the storage means 14. If necessary, the navigation engine 15 converts the received location coordinates of the link into a link ID, or, conversely, converts a link ID into the location coordinates of the link, and utilizes the converted information.

If data following the message management container is related to components related to parking lot information, the TPEG decoder 13 transmits information decoded by the components while notifying the navigation engine 15 that the data is related to the components related to the parking lot information, thus allowing the navigation engine 15 to store the decoded parking lot information in the memory 15a, separate from traffic flow status information, and to manage the stored information.

Meanwhile, the navigation engine 15 reads a required part of an electronic map from the storage means 14 on the basis of the current location coordinates received from the GPS module 18, and displays the read part on the LCD panel 17 through the drive 16. In this case, at the position corresponding to the current location, a specific graphic symbol is displayed.

Figure 12A:
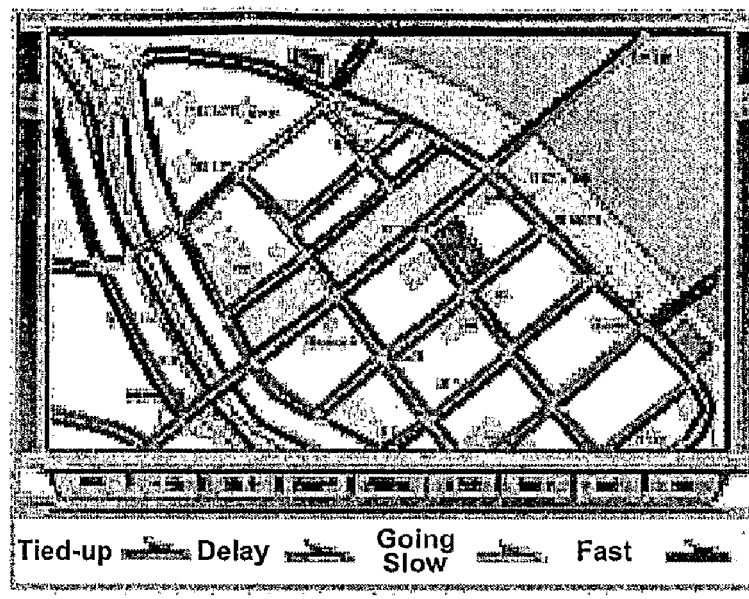
FIG. 12A is a diagram showing an example of the display of average speeds for respective links within an arbitrary area on a screen.

In this state, the navigation engine 15 displays the average link speed information, received from the TPEG decoder 13, on a link corresponding to the location coordinates of the location container, which follows the container, including the average link speed information, or corresponding to a link ID. Such a display method may include a method of representation in different colors according to average link speed, as shown in an example of FIG. 12A (for example, in the case of a normal road, a read color may indicate a speed per hour of 0 to 10 km, an orange color may indicate a speed per hour of 11 to 20 km, a green color may indicate a speed per hour of 21 to 40 km, and a blue color may indicate a speed per hour of 41 km or more), or a method of displaying numerals on corresponding links.

Further, in response to a user's request, the navigation engine 15 may display the link travel time and link delay for each link, received from the TPEG decoder 13, on the LCD panel 17, instead of or in addition to the average link speed.

The TPEG decoder 13 decodes time information, which has been coded according to the <time_span> information type corresponding to the syntax of FIG. 5 in the status components for link travel time and link delay, which are configured as shown in FIGS. 3C and 3D, formats the decoded time information using an internal transmission method agreed upon between the TPEG decoder 13 and the navigation engine 15, and transmits the formatted time information to the navigation engine 15. Such an operation is also equally applied to information coded according to the <specific_&_iterative_time> information type and the <period_of_time> information type, shown in FIGS. 6 and 7A, respectively.

When the user requests a traffic flow prediction situation from the navigation engine 15 through the unit device 19, the navigation engine 15 indicates information about a predicted average speed for each link of a current screen display region, which has been received from the TPEG decoder 13 and is stored in the memory 15a, instead of current average speed, and displays the predicted average speed information in color or as numerals. Of course, when the user requests a display mode as a predicted travel time mode, instead of a predicted average speed mode, the navigation engine 15 displays information about received predicted travel time for each link on the electronic map or graphic screen on the LCD panel 17. If predicted traffic flow information is provided, as shown in FIGS. 4F and 4G, the navigation engine 15 does not use the predicted information if the present date or the present day of the week does not belong to a specific prediction period obtained from the <period_of_time> field.

Figure 12B:
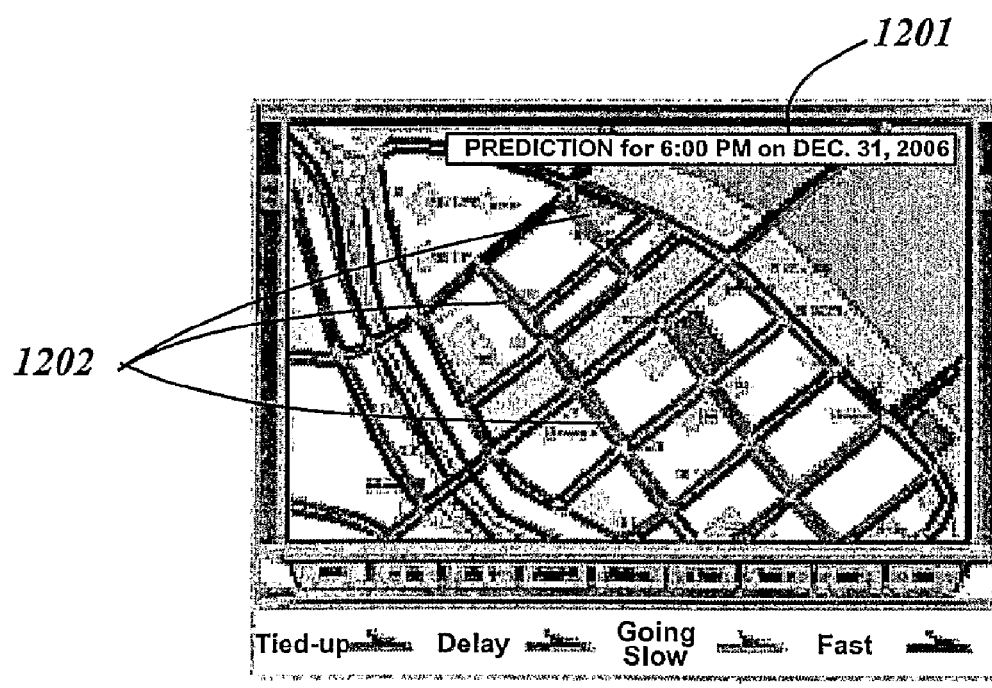
FIG. 12B is a diagram showing an example of the display of predicted average speeds for respective links within an arbitrary area on a screen.

In another embodiment of the present invention, a driver can designate a prediction time point through the unit device 19 so as to obtain predicted information. For example, the prediction time point can be designated as the time point one hour after the present time, or 7:30 PM. When designation is performed in this way, the navigation engine 15 checks predicted traffic flow information stored for each link belonging to a current screen display region, reads traffic flow information predicted for the prediction time point, coded and transmitted according to the UTC format or the <specific_&_iterative_time> information type of FIG. 6, when the prediction time point is identical to the time point input by the user, or approaches the input time point with a suitable temporal difference, and displays the predicted traffic flow information for a corresponding link in color, as shown in FIG. 12B. At this time, as shown in FIG. 12b, the prediction time is displayed on the upper portion of the screen (1201). Further, for a link having a prediction time which is not identical to or does not approach the time input by the user, a specific color, that is not used to display traffic flow status, for example, a gray color 1202, is used, in order to indicate "information not obtained".

Meanwhile, when an automatic channel search function for a destination is set in the navigation engine 15, a preferable channel (shortcut) can be searched for or re-searched for on the basis of the received predicted average link speed (or predicted link travel time). For example, for each link following an intersection at which a vehicle will arrive 30 minutes later at the current travel speed, predicted traffic flow information, which can be used as an average speed (or link travel time) predicted for a prediction period starting 30 minutes after the present time, or a time point 30 minutes after the present time, can be taken from the currently received predicted traffic flow information. Accordingly, the shortest link to the set destination is selected as a traveling channel, and the corresponding channel is displayed on the screen.

Figure 13A:
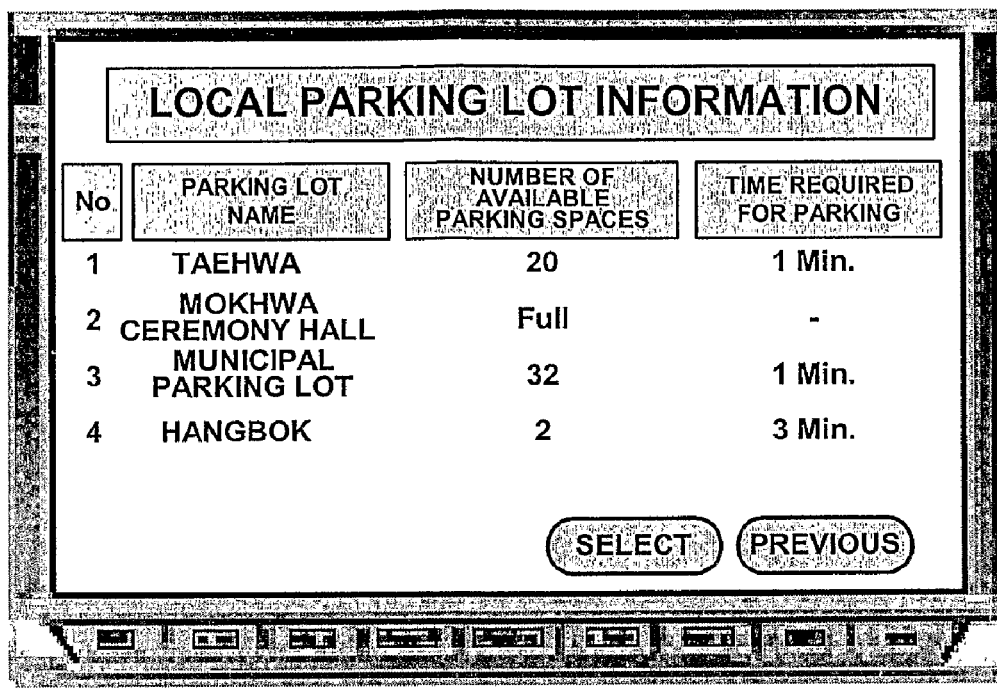
FIGS. 13A and 13B are diagrams showing examples of the display of information about parking lots on a screen.

The navigation terminal of FIG. 11 also selectively provides parking lot-related information, configured and provided according to FIG. 9 and FIGS. 10A to 10D, in response to the user's request. For example, when the user requests 'parking lot information' from the navigation engine 15 through the unit device 19, the navigation engine 15 searches for parking lot-related information, which has been decoded by the TPEG decoder 13 and is stored in the memory 15a, and arranges the names of parking lots having location information close to the current location (this information is obtained by decoding the location container 94 of FIG. 9), as shown in FIG. 13a. In this case, in order to improve a driver's convenience, the number of available parking spaces and the time required for parking (time corresponding to <time_span> information type), obtained from the current capacity component of FIG. 10D for a corresponding parking lot, are also written.

Figure 13B:
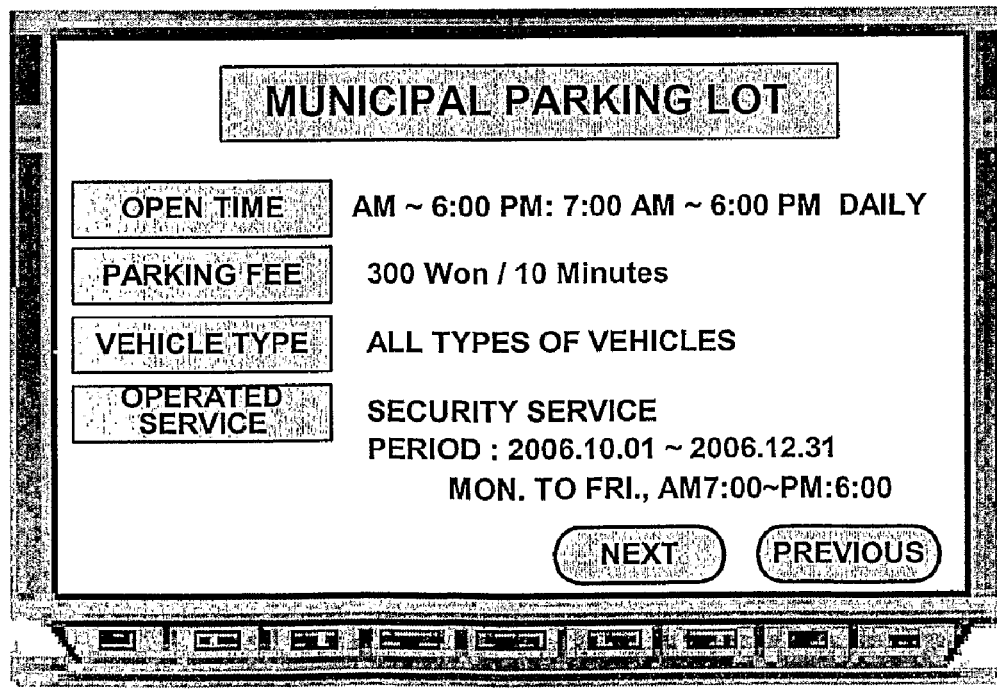

If the driver selects one from among the parking lots arranged in this way, the navigation engine 15 displays information about the selected parking lot, for example, information about open hours, which has been obtained from the open hours component of FIG. 10A, (that is, information included in and provided by the <specific_&_iterative_time> and <time_span> fields 1001 and 1002), information about fees per unit time (that is, information included in and provided by the <time_span> field 1010) obtained from the pricing/payment component of FIG. 10B, information about services and service operation times (that is, information included in and provided by the <period_of_time> field 1020), obtained from the operation service component of FIG. 10C, etc., on the screen, as shown in FIG. 13B. Of course, in addition to the above information, various types of parking lot-related information, provided by the server 100, can be provided. Further, information about a single parking lot can be separately displayed on a plurality of divided screens.

FIGS. 12A and 12B and FIGS. 13A and 13B illustrate only some of various examples of the display for providing information for vehicle travel, provided by the server 100, to a user through a screen. For such a display form, it is obvious that various modifications, revisions and supplementations can be realized. Therefore, although the form in which information for vehicle travel, described in the present invention, is displayed on a screen is simply changed, or the means of notifying a user is simply changed (for example, in audio format), it should be noted that such a construction falls within the scope of the claims of the present invention if it uses the gist of the configuration of information for vehicle travel and the processing method therefor, as disclosed in the claims of the present specification.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The above-described present invention allows the driver of a vehicle traveling in a large congested city to more rapidly reach a destination using predicted information about traffic flow on roads, thus allowing the driver to conveniently use parking lots.

Further, the present invention can represent information about time points, durations or periods used to provide information for vehicle travel, in detail and minutely, can precisely represent information about a period, etc., using only a small amount of data if the data is suitably used, and can efficiently code information to be coded by utilizing information about repeat occurrences. Accordingly, the information coding efficiency can be improved.

The invention claimed is:

1. A method of processing information for vehicle travel, comprising:
   generating at least one component including information for vehicle travel; and
   incorporating information about a duration into the component,
   wherein the information about a time duration includes a selector indicating a type of loaded information, and includes at least one of information elements indicating number of years, number of months, number of days, number of hours, number of minutes, and number of seconds, depending on a value of the selector,
   wherein the information about vehicle travel is information about a fee system of a parking lot, and the information about a time duration is information about a unit time for calculation of a fee.

2. The method according to claim 1, wherein the information for vehicle travel is information about a current or predicted travel time for a road link.

3. A method of processing information for vehicle travel, comprising:
   generating at least one component including information for vehicle travel; and
   incorporating information about a duration into the component,
   wherein the information about a time duration includes a selector indicating a type of loaded information, and includes at least one of information elements indicating number of years, number of months, number of days, number of hours, number of minutes, and number of seconds, depending on a value of the selector,
   wherein the information about vehicle travel is information about opening of a parking lot, and the information about a time duration is information about a duration during which the parking lot is open.

4. A method of processing information for vehicle travel, comprising:
   generating at least one component including information for vehicle travel; and
   incorporating information about a duration into the component,
   wherein the information about a time duration includes a selector indicating a type of loaded information, and includes at least one of information elements indicating number of years, number of months, number of days, number of hours, number of minutes, and number of seconds, depending on a value of the selector,
   wherein the information about vehicle travel is information about services provided in a parking lot, and the information about a time duration is information about a duration during which the services are provided.

5. A method of processing information for vehicle travel, comprising:
   generating at least one component including information for vehicle travel; and
   incorporating information about a duration into the component,
   wherein the information about a time duration includes a selector indicating a type of loaded information, and includes at least one of information elements indicating number of years, number of months, number of days, number of hours, number of minutes, and number of seconds, depending on a value of the selector,
   wherein the information about vehicle travel is information about a current capacity of a parking lot, and the information about a time duration is information about time required to park a vehicle.

6. A method of processing traffic information, comprising:
   encoding the traffic information including information about vehicle travel; and
   transmitting encoded traffic information,
   wherein the traffic information includes information about a time point including at least one of information elements indicating a year value, a month value, a day value, an hour value, a minute value, and a second value, and
   wherein the traffic information further includes information about opening of a parking lot, and the information about a time point is information about a time point at which the parking lot is open.

7. The method according to claim 6, wherein the information about a time point further includes a selector indicating a type of loaded information, and the selector includes a bit element indicating whether repetition occurs at a time point designated by part or all of the information elements.

8. The method according to claim 6, wherein the traffic information further includes information about a predicted travel time for a road link, and the information about a time point is information about a future time point for which the predicted travel time is obtained.

9. A method of processing traffic information, comprising:
   encoding the traffic information including information for vehicle travel; and
   transmitting encoded traffic information,
   wherein the traffic information includes information about a period including period information for designating a specific period, and at least one of a day selection information element, a time point information element, and a duration information element,
   wherein the day selection information element includes a selector for individually indicating Monday, Tuesday, Wednesday, Thursday, Friday, Saturday, or Sunday.

10. The method according to claim 9, wherein the time point information element includes selection information indicating a type of loaded information, and includes at least one of elements indicating a year, month, day, hour, minute and second.

11. The method according to claim 10, wherein respective time elements, indicating start time and end time in the period information, are time values coded according to a same type as that of the time point information element.

12. The method according to claim 9, wherein the duration information element includes selection information indicating a type of loaded information, and includes at least one of elements indicating number of years, number of months, number of days, number of hours, number of minutes, and number of seconds.

13. The method according to claim 9, wherein the information for vehicle travel is information about a predicted travel time for a road link, and the information about a period is information for designating a specific period, for which the predicted travel time is applied, and designating at least one of a time duration, a day and a time point within the specific period.

14. A method of processing information for vehicle travel, comprising:
   generating at least one component including information for vehicle travel; and
   incorporating information about a period into the component, wherein the information about a period includes period information for designating a specific period, and a selector for indicating a type of loaded information, and includes at least one of a day selection information element, a time point information element, and a duration information element, depending on a value of the selector, wherein the information for vehicle travel is information about services provided in a parking lot, and the information about a period is information for designating a specific period, for which the services are provided, and designing at least one of a time duration, a day and a time point within the specific period.

15. A method of processing traffic information, comprising:

receiving traffic information including information for vehicle travel; and decoding the received traffic information, wherein the traffic information includes information about a time duration including at least one of information elements indicating number of years, number of months, number of days, number of hours, number of minutes, and number of seconds, wherein the information about vehicle travel is information about services provided in a parking lot, and the information about a time duration is information about a duration during which the services are provided.

16. A method of processing traffic information, comprising:

receiving traffic information including information for vehicle travel; and decoding the received traffic information, wherein the traffic information includes information about a time point including at least one of information elements indicating a year value, a month value, a day value, an hour value, a minute value, and a second value, wherein the information about vehicle travel is information about opening of a parking lot, and the information about a time point is information about a time point at which the parking lot is open.

17. The method according to claim 16, wherein the traffic information further includes a selector indicating a type of loaded information, and the selector includes a bit element indicating whether a time point designated by part or all of the information elements is repeated.

18. A method of processing traffic information, comprising:

receiving the traffic information including information for vehicle travel; and decoding the received traffic information, wherein the traffic information includes information about a period including period information for designating a specific period and at least one of a day selection information element, a time point information element, and a duration information element, wherein the day selection information element includes a selector for individually indicating Monday, Tuesday, Wednesday, Thursday, Friday, Saturday, or Sunday.

19. The method according to claim 18, wherein the time point information element includes selection information indicating a type of loaded information, and includes at least one of elements indicating a year, month, day, hour, minute and second, depending on a value of the selection information, the selection information including a bit element indicating whether present date and time are used.

20. The method according to claim 18, wherein the duration information element includes selection information indicating a type of loaded information, and includes at least one of elements indicating number of years, number of months, number of days, number of hours, number of minutes, and number of seconds, depending on a value of the selection information.

21. A method of processing traffic information, comprising:

encoding the traffic information; and transmitting encoded traffic information, wherein the traffic information includes information about a time duration including at least one of information elements indicating number of years, number of months, number of days, number of hours, number of minutes, and number of seconds, and wherein the traffic information includes information about a fee system of a parking lot, and the information about a time duration is information about a unit time for calculation of a fee.

* * * * *